United States Patent [19]

Harman

[11] Patent Number: 5,383,064
[45] Date of Patent: Jan. 17, 1995

[54] AUTOMATIC CLOSED LOOP ADJUSTMENT OF ANALOG READ SIGNALS UNDER MICROPROCESSOR CONTROL

[75] Inventor: Jefferson H. Harman, Thousand Oaks, Calif.

[73] Assignee: Wangtek, Inc., Simi Valley, Calif.

[21] Appl. No.: 46,687

[22] Filed: Apr. 13, 1993

[51] Int. Cl.⁶ .......................... G11B 5/09; G11B 5/02
[52] U.S. Cl. ........................................ 360/45; 360/67
[58] Field of Search ........................ 360/45, 31, 44, 66, 360/67, 78, 46, 53, 65, 40

[56] References Cited

U.S. PATENT DOCUMENTS

| | | | |
|---|---|---|---|
| 4,300,174 | 11/1981 | Harman et al. | 360/66 X |
| 4,306,257 | 12/1981 | Harman | 360/67 |
| 4,371,900 | 2/1983 | Huber | 360/40 |
| 4,635,141 | 1/1987 | Coulter | 360/44 |
| 5,081,547 | 1/1992 | Howell | 360/46 X |

Primary Examiner—Donald Hajec
Assistant Examiner—Patrick Wamsley
Attorney, Agent, or Firm—Robbins, Berliner and Carson

[57] ABSTRACT

A closed loop resolution enhancement technique for reducing density effects to permit increased digital data storage density on magnetic media and improve data reliability for at a given density, uses a predetermined test pattern written on the medium to determine the ratio of amplitudes of high and low frequency components of the test pattern and adjust a resolution value. After a test pattern read operation is used to adjust the resolution value, the same value is used during normal data recovery operations.

30 Claims, 4 Drawing Sheets

AUTOMATIC CLOSED LOOP ADJUSTMENT OF ANALOG READ SIGNALS UNDER MICROPROCESSOR CONTROL

BACKGROUND OF THE INVENTION

1. Field of the Invention

This invention relates generally to techniques for the storage and recovery of magnetically recorded digital information and more particularly, relates to improvements in the readout of digital information recorded on magnetic tape cassettes, disks or diskettes.

2. Description of the Prior Art

Digital information is conventionally recorded on magnetic surfaces by causing a series of flux transitions or reversals to occur on the magnetic surface. The spacing of these flux transitions encodes the data being recorded. One well known problem, exacerbated by the requirements for higher density recording formats, is the problem of peak shift due to density effects.

As density requirements are increased, the flux transitions are recorded more closely together. When transitions are stored too closely together a problem known as pulse crowding or density effects occurs. This phenomenon causes the peaks of closely spaced, or crowded, transitions bounded by wider spaced transitions to move into that wider space between such wider spaced transitions. This movement or spatial shifting is translated into a time shift by the speed of the relative motion between the medium and the read head. The resultant apparent time shift of the peak, known as peak shifting, makes accurate decoding of the spatially encoded digital data more difficult and imposes a fundamental limit on magnetic data recording density.

The same phenomenon also reduces the output amplitude of closely spaced transitions relative to the amplitude of more widely spaced transitions. Both the peak shifting as well as the amplitude loss of closely spaced or crowded flux transitions can be shown from the linear superposition of individual, isolated transitions and causes an effective low pass filtering of the recorded data.

In particular, conventional digital recording techniques such as 1-7 and 2-7 RLL, MFM, GCR, FM, PE, and NRZ coding techniques, encode the magnetic information by controlling the relative positions of, i.e. the spacing between, the magnetic flux transitions. Such conventional encoding techniques may therefore all be considered phase modulation techniques in that the data are decoded by determining the relative time delays between such transitions. A varying time delay within the band of frequencies of interest for this phase modulation, such as may be caused by peak shifting as discussed above or the use of a filter with non-linear phase characteristics, impedes accurate signal decoding and recovery.

Conventional read channels are therefore typically designed for constant group delay characteristics, that is, designed to have linear phase versus frequency characteristics. Fortunately, the equivalent low pass filtering caused by the density effects also usually has a linear phase versus frequency characteristic.

Additionally, digital data recovery systems commonly intentionally utilize frequency discriminating filters, including low pass filtering, to reduce unwanted noise and interference. In such systems, noise is typically introduced into the signals being recovered from several sources. The power of such statistical noise is therefore proportional to the bandwidth of the channel through which the signals to be processed pass. Frequency discriminating filters are used to limit the power of such noise, and to reject interference from higher frequency sources, while passing the signals in the frequency range of the signal being recovered. Typically, the frequency band of interest in the signal being recovered is allowed to pass through in the filters while the noise power is reduced by a low pass filter.

To avoid phase distortion, such low pass filters are conventionally required to be linear phase filters, such as a Bessel filter. However, simple linear phase low pass filters do not usually have sharp amplitude cut offs. That is, such filters typically have a slow amplitude rolloff with increasing frequency so that the amplitude of higher frequency signals is undesirably reduced. The selection of the "cutoff frequency" of such noise and interference reducing filters is therefore usually a compromise between noise reduction and the ability to pass the higher frequencies in the signals being recovered. The loss of such high frequencies, caused by the above noted, unwanted slow rolloff of the linear phase low pass filters used to reduce noise power in the band of interest, results in further peak shifting similar in effect to those caused by density effects, always in a direction which aggravates this problem.

The analog readback signal from the read head is a complex waveform containing the harmonics and sidebands necessary to support the frequency shifts caused by the intentionally uneven peak spacing used to encode the data. The loss of even some of these higher frequency signals, by for example the equivalent low pass filtering resulting from density effects, distorts the relative time between successive peaks in the readback signal and thereby impedes accurate data recovery.

One way of measuring or comparing the relative frequency responses of such systems is the figure of merit known as resolution. Resolution is often defined as the ratio of the amplitude of the analog readback signal at the highest transition rate or density in the coding scheme being used to the amplitude of the readback signal at the lowest transition density in the coding scheme being used. That is, resolution is defined as the amplitude ratio of the highest fundamental frequency to the lowest fundamental frequency for the code being used. Resolution is therefore a two point measurement of the frequency response of the noise filter, media and head as a system.

One improvement in digital magnetic data recovery has been the use of slimming filters: a class of linear phase filters which have a rising amplitude response that can be controlled to mirror and therefore compensate for the loss of some of the high frequency portions of the recovered signals due to density and other effects.

Slimming filters are implemented as additive filters in that a circuit providing a linear phase transfer function having a rising amplitude as a function of frequency is added to a low pass filter with a matching phase characteristic to mirror the undesired high frequency rolloff of the media and head system due to density effects. Slimming filters can be implemented in various known ways; such as by subtracting signals from the input and output taps of a terminated delay line from the center tap of that line; by subtracting, from the output of a delay line whose source is terminated and whose output is at a high impedance, the signal at the tap between the source termination and the input of the line; by subtracting the output of a second order high pass filter from the output of a low pass filter with matching phase characteristic; by cascading a system consisting of a second order bandpass filter subtracted from a matching low pass filter; or by subtracting the output of a fourth order band-pass filter from a fourth order low pass filter with matching phase characteristic. Various other known techniques, including the addition of appropriately signed even derivatives, are also available for use in slimming filters.

When high pass or band-pass filters are used, the Q and natural resonant frequencies of such filters are selected to make these elements, in combination with the other elements present in such filters, operate to form a linear phase filter. When subtraction is used, the shape of the amplitude response can be tailored by adjusting how much of one channel is subtracted from the other. In fact, in accordance with U.S. Pat. No. 4,306,257 issued in 1981 to the inventor hereof, the subtracting may be made adaptive. In particular, as used in that patent, the filter response was tailored to the varying bit density of a disk.

What are needed are further enhancements of the techniques available for use with higher data densities to eliminate or reduce density effects.

SUMMARY OF THE INVENTION

The preceding and other shortcomings of prior art systems are addressed and overcome by the present invention that uses a predetermined test pattern written to magnetic media to determine the resolution of the head medium combination with respect to that particular magnetic medium. The characteristics of a programmable slimming filter applied to the analog readback signal are then modified in accordance with the resolution so determined to adjust the resolution to a selected value.

In a first aspect, the present invention provides a method of recovering digital data stored on magnetic media by reading data from the magnetic medium with a read head to determine a resolution value representing the frequency response of the medium and head combination and modifying the frequency characteristics of the read channel in accordance with the resolution value so determined.

In a further aspect, the invention provides a system for recovering digital data stored on magnetic media having a read head for reading data from the magnetic medium to determine a resolution value representing the frequency response of the combination of the medium and the read head and means for modifying the frequency characteristics of data read from the medium in accordance with the resolution value.

The foregoing and additional features and advantages of this invention will become further apparent from the detailed description and accompanying drawing figures that follow. In the figures and written description, numerals indicate the various features of the invention, like numerals referring to like features throughout for both the drawing figures and the written description.

DETAILED DESCRIPTION OF PREFERRED EMBODIMENT(S)

Figure 1:
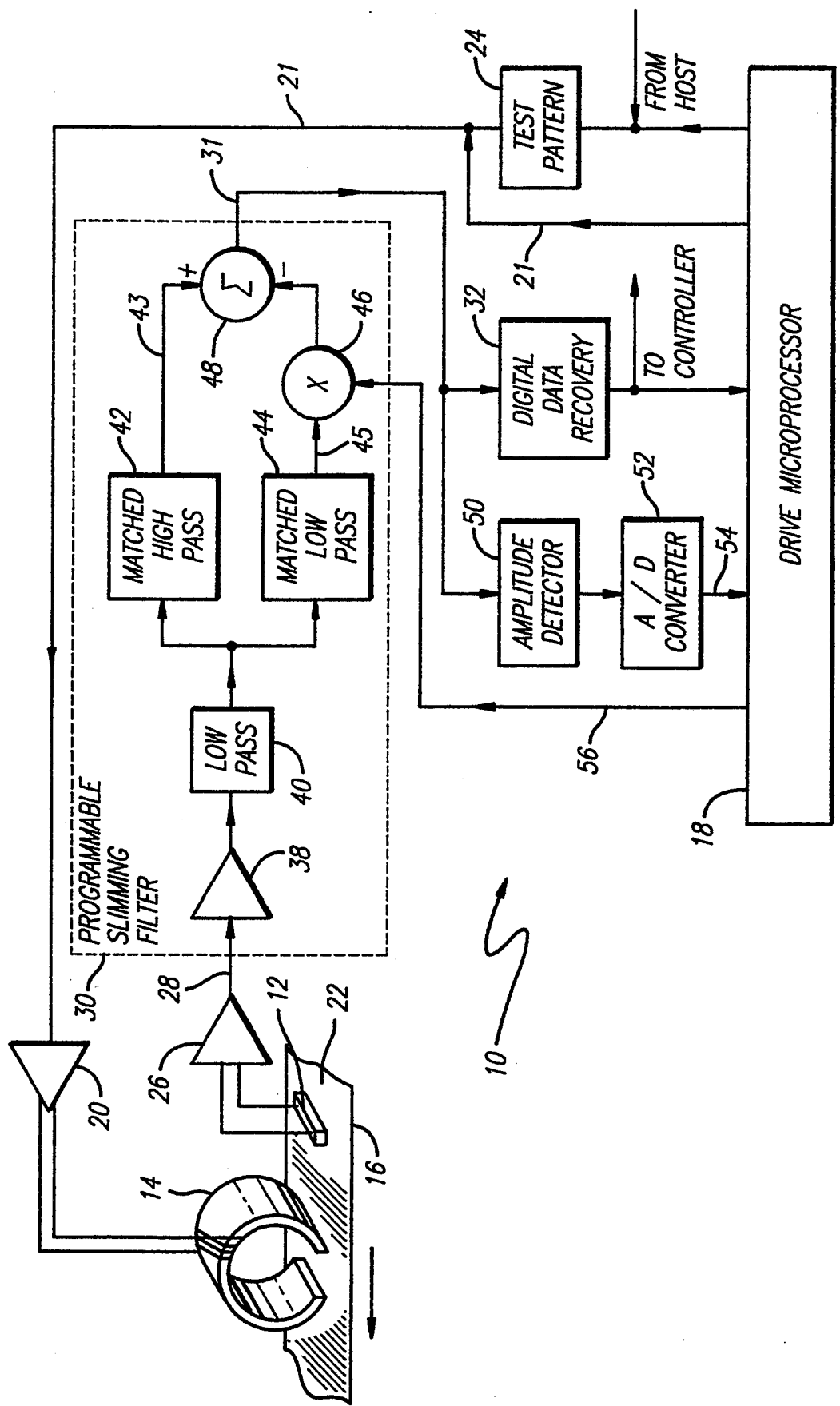
FIG. 1 is a block diagram showing a system according to the present invention for providing closed loop adaptive control of the resolution of a system for the recovery of digital data from magnetic media.

FIG. 1 is a block diagram showing closed loop adaptive control system 10 including read head 12, which in accordance with a preferred embodiment of the present invention is a magnetoresistive or MR read head, and write head 14, for writing data to and reading data from the magnetic data medium, such as tape segment 16. Data are written on tape segment 16 in the form of spatially encoded flux transitions under the control of drive microprocessor 18 through write head cable 21 to write circuit 20 in a conventional manner. In addition, according to the present invention, a predetermined test pattern such as test pattern 22 in the form of alternating high and low frequency or transition density areas, may also be written to tape segment 16 by write circuit 20 and write head 14.

Test pattern 22 may be written on tape segment 16 during an earlier formatting operation or during operation of closed loop adaptive control system 10. For writing during operation of closed loop adaptive control system 10, test pattern 22 may conveniently be stored in test pattern memory 24 or other memory storage and operated in response to drive microprocessor 18 or another processor source, indicated generally as a host processor.

Read head 12 is connected to read preamplifier 26 to produce analog readback signal 28 which is applied as a data signal input to programmable slimming filter 30. A control signal input is applied by drive microprocessor 18 in the form of slimming filter control signal 56 as will be described below in greater detail. During normal data recovery operations, slimming filter output 31 from programmable slimming filter 30 is applied to conventional digital data recovery subsystem 32, the output of which is applied to a conventional drive controller, not shown. During adaptive control of the resolution of system 10, as described below, the output of digital data recovery subsystem 32 is also used by drive microprocessor 18, during measurement of the resolution, to determine the transition rate of the test data being monitored.

In particular, in addition to the conventional read and write operations generally described above, closed loop adaptive control system 10 according to the present invention measures actual resolution and adapts the characteristics of slimming filter 30 to achieve the desired system resolution. This is accomplished by iterations of a test pattern read operation with a resultant adjustment of DAC 46, to be described in greater detail below.

In the test pattern read operation, drive microprocessor 18 operates read head 12 to read test pattern 22 on magnetic tape segment 16 to determine a value or figure of merit for the medium and head combination, such as the resolution.

In the test pattern read operation, read head 12 converts the flux transitions in test pattern 22 into an analog signal applied to read preamplifier 26 and then to readback signal 28 applied to slimming filter 30. Slimming filter 30 may include amplification, such as slimming filter amplifier 38, as well as low pass filter 40 which, as noted above with regard to conventional slimming filters, is used to reduce noise power by cutting off signals above the frequencies of interest. Low pass filter 40 may be any conventional low pass filter of any order, such as a first or second order filter.

The output of low pass filter 40 is applied to both matched high pass filter 42 and to matched low pass filter 44 which are then combined to form slimming filter output 31. Output 45 of matched low pass filter 44 is applied to a gain control circuit, such as multiplying digital to analog converter or DAC 46, the gain of which is controlled by drive microprocessor 18 via slimming filter control signal 56, as described in greater detail below, before outputs 43 and 45 are combined in summer 48.

Matched high pass filter 42 and low pass filter 44 are selected to avoid phase distortion. This is accomplished if these filters are selected so that, for example, the Laplace transforms of the filter functions of these filters have equal denominators and the Laplace transform of high pass filter 42 contains only even powers of S in its numerator. A simple example of matched filters in which phase distortion is avoided in this manner is the combination of a second order low pass filter matched to a second order high pass filter to form a slimming filter output.

The outputs of filters 42 and 44 are combined in summer 48 to form slimming filter output 31 which enhances the resolution of the head/media combination. In particular, in accordance with the present invention, output 43 of high pass filter 42 is summed with output 45 of low pass filter 44 in a ratio determined by the setting of multiplying DAC 46 in accordance with slimming filter control signal 56 provided by microprocessor 18.

The test pattern read operation is used to adjust slimming filter output 31 for a preselected or optimum resolution by measuring the actual resolution of the system in response to test pattern 22 and adjusting the characteristics of slimming filter 31 until the desired or predetermined resolution is achieved. Such adjustments would remain fixed at all other times unless required to be changed for special circumstances, such as during the power turn on operation of a drive microprocessor 18 having a volatile memory, in which case a nominal setting may be provided.

In the resolution adjusting operation, output 31 of summer 48 at the output of slimming filter 30 is applied to amplitude detector 50 and then to analog to digital converter 52 to provide amplitude information 54 to drive microprocessor 18. At the same time, read data timing is recovered by digital data recovery circuits 32 and applied to drive microprocessor 18. This permits drive microprocessor 18 to calculate resolution from amplitude information 54 and the related read data timing or frequency information provided via digital data recovery circuits 32.

In particular, the transition rate of the test data being recovered is determined at the same time the amplitude of the recovered data is determined. When, for example, the amplitudes of high transition rate data and low transition rate data have been alternatively determined by sequentially reading a pattern of such high and low transition rate data in test pattern 22, resolution may be calculated by microprocessor 18. After resolution has been determined, drive microprocessor 18 readjusts the mix of signals summed in summer 48 by adjusting the ratio between output 45 of matched low pass filter 44 and output 43 of matched high pass filter 42 by controlling multiplying DAC 46 with slimming filter control signal 56. Thereafter, the test pattern read operation is repeated in order to determine the then current value of resolution which reflects the changed characteristics of programmable slimming filter 30.

This process is repeated iteratively until the desired resolution is achieved. Thereafter, the resolution is maintained at this desired value by maintaining the settings of multiplying DAC 46 until the next time the resolution is adjusted. Such readjustments may be desirable, for example, when magnetic tape segment 16 is changed.

In particular, the result of a successful test pattern read operation is the determination of amplitude information 54, for data at differing transition rates, which is applied to drive microprocessor 18 to generate slimming filter control signal 56 which is applied to multiplying DAC 46. In this manner, the frequency response or resolution of the head/media combination may be determined for a known test pattern and then used to compensate or adjust the response of slimming filter 30 so that subsequent read operations may be performed at the desired resolution with reduced errors due to density effects.

During data read operations, read head 12 and preamp 26 provide analog readback signal 28 to slimming filter 30 for data recovery by digital data recovery subsystem 32. In slimming filter 30, analog signal 28 is applied to low pass filter 40 to reduce noise and then to the combination of high pass filter 42 and low pass filter 44 which acts as a slimming filter. Filters 40, 42 and 44 serve to pass the frequencies of interest, cutting off frequencies in which no data, but only noise, would be present while compensating for high frequency rolloff losses. This filtering is a conventional practice to improve the signal-to-noise ratio, or SNR, of the signal being read for subsequent processing.

The process of data recovery of digital data stored as flux transitions on a magnetic media consists of determining if a flux transition has occurred, and if so, when the flux transition has occurred. The relative timing of the occurrence of the detected flux transition is therefore of paramount importance and, for this reason, phase distortion must be avoided. Filters 40, 42 and 44 are therefore all required to be substantially linear phase filters.

The high frequency rolloff of conventional low pass linear phase filters, such as low pass filter 40, is relatively slow. Similarly, the high frequency rolloff of the head and media system, as present in read back signals 28, is also slow. A slimming filter, such as slimming filter 30, is used to compensate for the slow rolloff of both low pass filter 40 as well as the head/media system.

In operation of slimming filter 30, outputs of 43 and 45 of high pass filter 42 and low pass filter 44 respectively are combined to form a slimming filter for the data signal being read by read head 12. The mix of output 43 from matched high pass filter 42 and output 45 from matched low pass filter 44 combined in summer 48 to form slimming filter output 31 may be adjusted to a desired effective resolution by control of multiplying DAC 46 via slimming filter control signal 56. The amplitude of low frequency pulses and high frequency pulses are determined from amplitude detector 50 and converted to digital form by analog to digital converter 52. Digital data recovery circuits 32 provide drive microprocessor 18 with the frequency or transition density of the pulses in test pattern 22, allowing drive microprocessor 18 to adjust multiplying DAC 46 via slimming filter control signal 56 to adjust the effective resolution to a desired value, such as 1, in a closed loop fashion. Once the effective resolution is set, the computer will maintain the value of slimming filter control signal 56 until it is desired to adjust the resolution again, for example, when magnetic tape segment 16 or the system power has been cycled off and on.

By compensating for density effects by adapting the resolution of the media/head system, the density attainable in recording and retrieving digital data stored on a magnetic medium may be substantially improved. Test pattern 22 may be written on tape segment 16 during a preliminary pass, so that tape segment 16 is prepared for resolution testing. Test pattern 22 may be read during one or more preliminary passes before digital data are read so that amplitude information 54 may be used by drive microprocessor 18 to calculate resolution and readjust multiplying DAC 46 via slimming filter control signal 56 until the desired resolution is obtained. The resultant setting of multiplying DAC 46 is then the proper setting for establishing the effective resolution for all digital data stored on magnetic tape segment 16 and is then stored, for example in drive microprocessor 18, for all subsequent reading of magnetic tape segment 16. The setting for multiplying DAC 46 will then be recalibrated in the same manner when a new tape is installed or when power is cycled off and on again.

Figure 2:
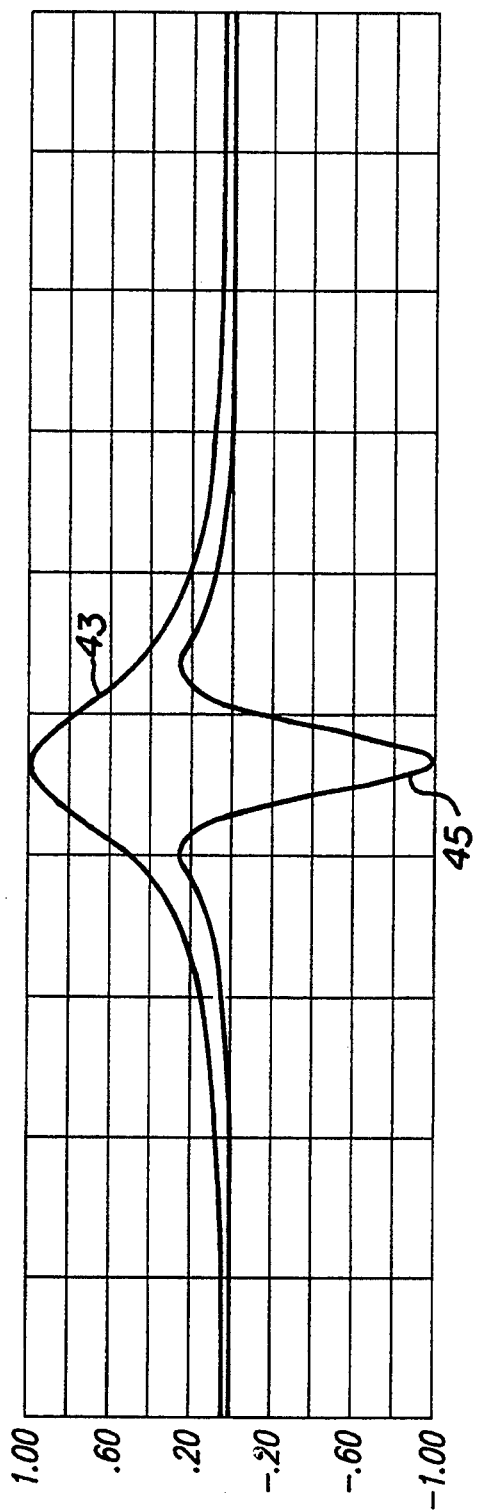
FIG. 2 is a graph showing output 45 of matched low pass filter 44 and output 43 of matched high pass filter 42, of FIG. 1, on the same time scale in response to an isolated pulse.
Figure 3:
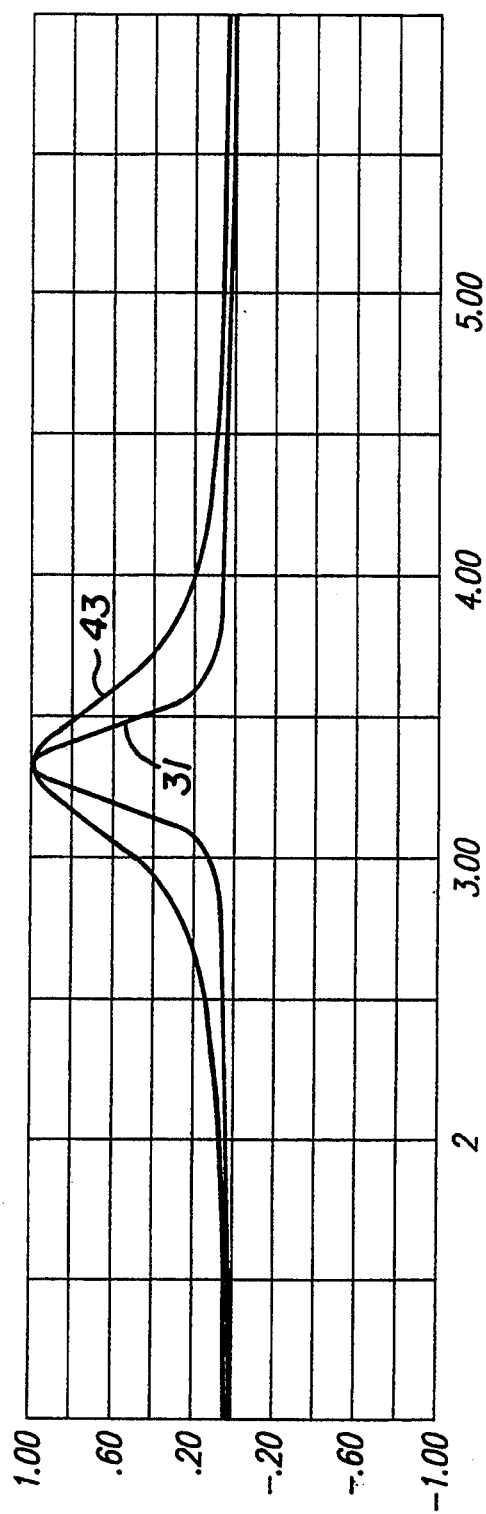
FIG. 3 is a graph showing output 45 of matched low pass filter 44 and output 31 of slimming filter 30, of FIG. 1, on the same time scale in response to the same isolated pulse.

FIG. 2 is a graph showing output 43 of matched low pass filter 44 and output 45 of matched high pass filter 42 on the same time scale in response to an isolated pulse. FIG. 3 is a graph showing output 43 of matched low pass filter 44 and slimming filter output 31 of slimming filter 30 on the same time scale in response to the isolated pulse shown in FIG. 2.

Referring now to FIGS. 2 and 3, it is important to note that slimming filter output 31, in response to an isolated pulse is a pulse of nearly the same shape as output 43 from matched low pass filter 44, but with a dramatically narrower pulse width. This narrowing of the pulse width in slimming filter output 31 reduces interference between adjacent pulses in slimming filter output 31 compared to the interference and resultant peak shifting that would otherwise be a problem in analog readback signal 28 of a conventional digital data recording system without a slimming filter. Note also that in accordance with the present invention, slimming filter output 31 is derived by subtracting an appropriate amount of matched low pass filter output 45 from matched high pass filter output 43.

Figure 4:
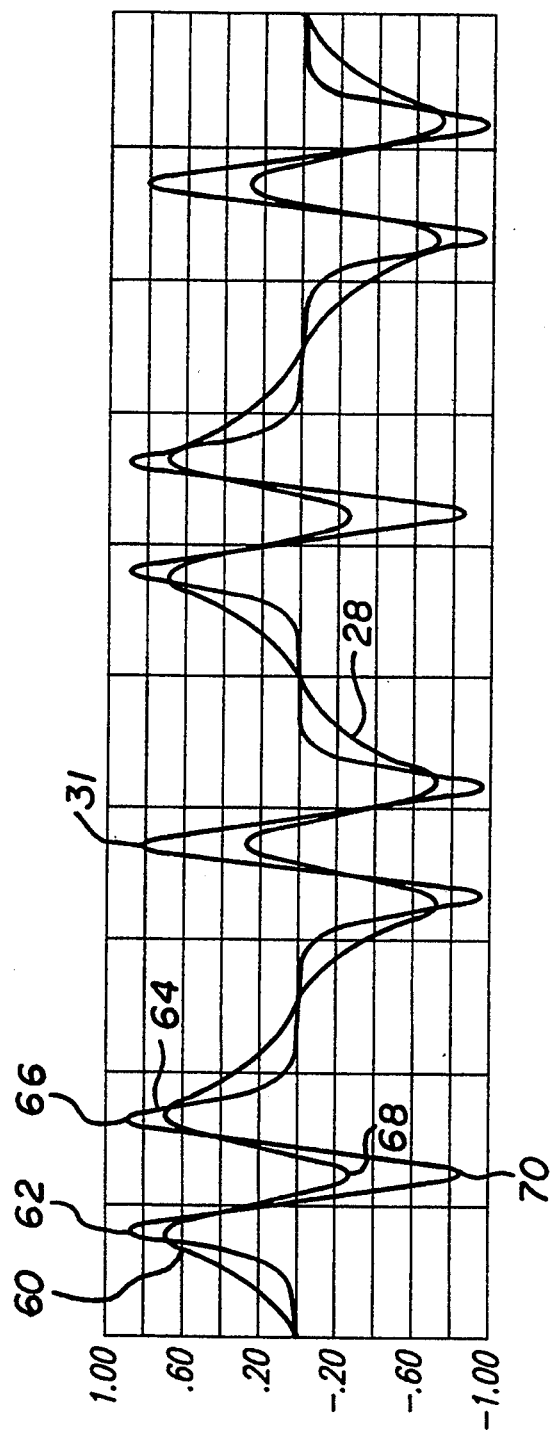
FIG. 4 is a superposition of the graphs of analog readback signal 28 and output 31 of programmable slimming filter 30 in response to a 1-7 tribit code signal in accordance with the present invention.

FIG. 4 is a simultaneous display of analog signal 28 from read preamplifier 26, marked with dots for convenient identification, and slimming filter output 31. For the purposes of this explanation, the two signals are shown shifted in time to remove the effects of the time delay associated with any such filtering. This linear phase time delay is not of great consequence and, when removed as shown in FIG. 4, permits a clearer picture of the benefits of pulse slimming. The output shown is that which would occur in a "tribit" pattern resulting from 2-7 encoding, a currently popular method of encoding digital data on magnetic tape or disk.

In FIG. 4, it is important to note that slimming filter output 31 is improved with respect to read back signal 28 in two major respects, peak shifting as well as swallowing or loss of middle peak amplitude.

With respect to peak shifting, the peaks of the first pulse in each of the tribit sequences in the unslimmed data have been shifted to the left, that is it appears early, while the third pulse in each tribit sequence in the unslimmed data has been shifted to the right so that the pulse appears late. These peak shifts have been corrected or eliminated in slimming filter output 31. For example, unslimmed first peak 60 occurs slightly before slimming filter output first peak 62 while unslimmed third peak 64 appears slightly after slimming filter output third peak 66.

Figure 5:
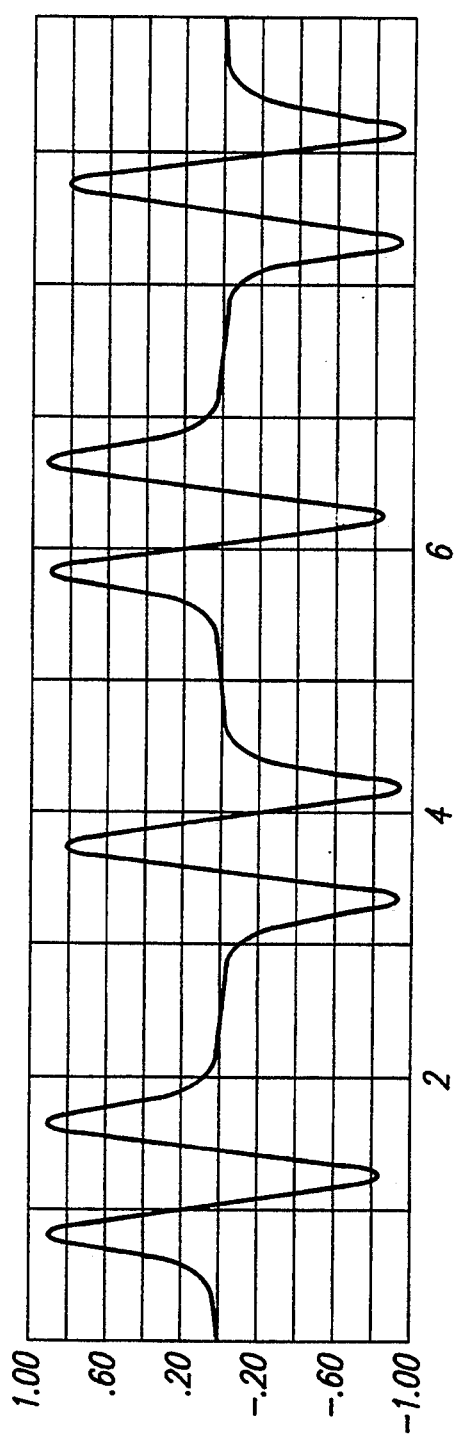
FIG. 5 is a graph of output 31 of FIG. 4 shown by itself for clarity.

Secondly, with respect to loss of amplitude of the second or middle peak which is known as swallowing, unslimmed middle pulse 68 shows a substantial amplitude loss which is clearly shown to have been restored in slimmed middle pulse 70. These improvements may be more clearly viewed in FIG. 5 which is a re-display of slimming filter output 31 alone, as shown above in FIG. 4.

Referring now again to FIG. 1, if tape segment 16 is write protected, it will not be possible to use write test pattern 22. If test pattern 22 had already been written by a previous operation, it may still be read by read head 12 and used to determine amplitude information 54 and related frequency information from digital data recovery circuits 32 so that resolution compensation may still be achieved.

If tape segment 16 is write protected and test pattern 22 has not been written thereon, a default value for slimming filter control signal 56 may be stored in drive microprocessor 18 to provide at least an open loop resolution enhancement.

Test pattern 22 may be written on disk media in multiple areas to obtain a profile of the change in resolution due to changing data density with track radius.

Figure 6:
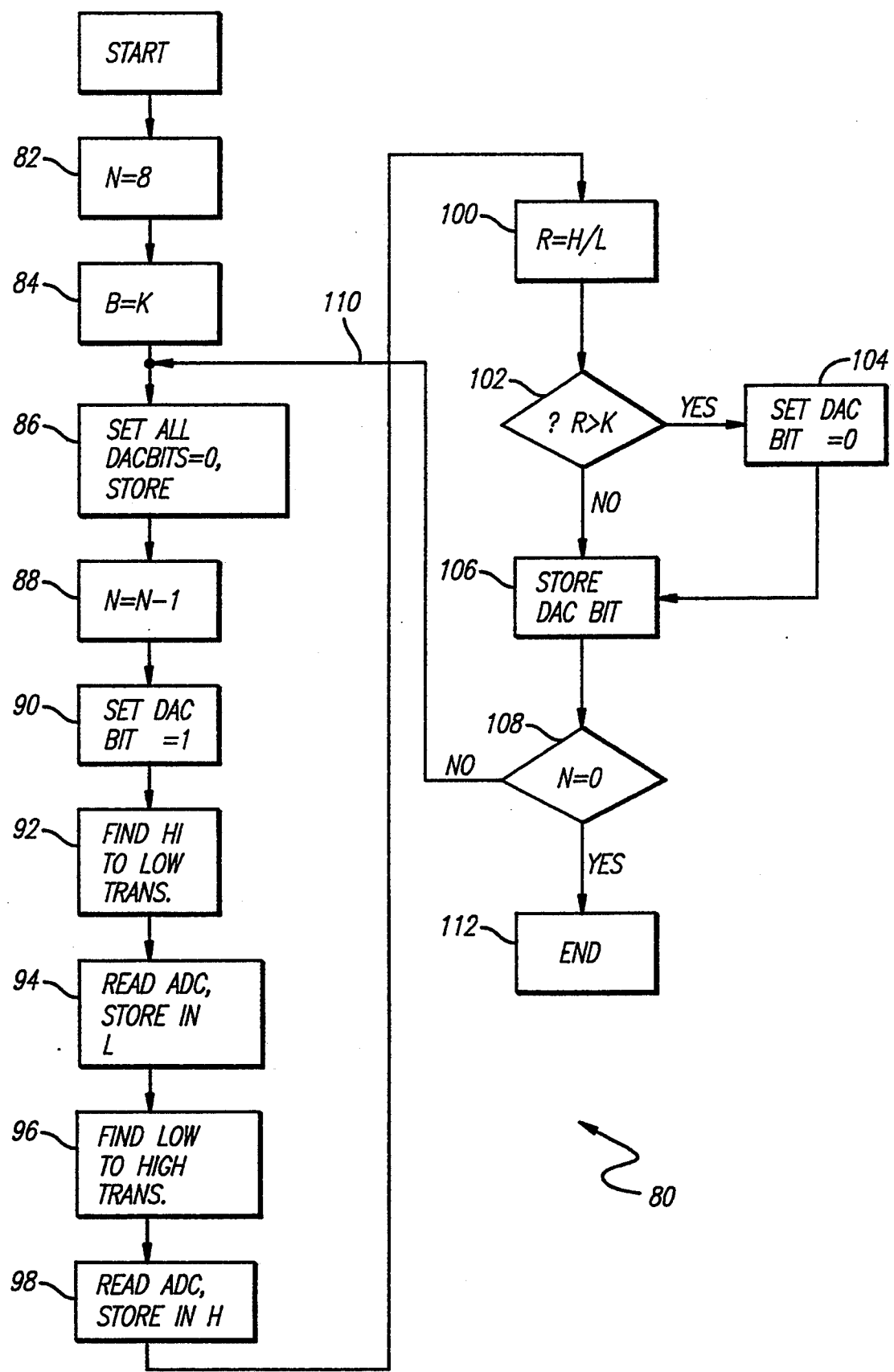
FIG. 6 is a flowchart of an algorithm 80 which may be implemented in drive microprocessor 18 for setting or adjusting the value of multiplying DAC 46 of closed loop adaptive control system 10 shown in FIG. 1.

FIG. 6 is a flowchart of an algorithm 80 which may be implemented in drive microprocessor 18 for setting or adjusting the value of multiplying DAC 46 of closed loop adaptive control system 10 shown in FIG. 1. The test pattern read operation is used to adjust programmable slimming filter 30 for a preselected or optimum resolution by measuring the actual resolution of the system in response to test pattern 22 and adjusting the characteristics of programmable slimming filter 30 until the desired or predetermined resolution is achieved. This is accomplished by iterations of a test pattern read operation with a resultant adjustment of multiplying DAC 46. A successive approximation approach is used to find the correct setting for multiplying DAC 46. The multiplier in multiplying DAC is represented by a multibit DACbit word.

Referring back to FIG. 6, initialization is accomplished in steps 82, 84 and 86. Algorithm 80 begins by setting iteration count N (step 82) in accordance with the number of bits in the DACbit word. DACbit words typically consist of a plurality of binary bits, the left most bit being considered the most significant bit. For illustrative purposes, the following discussion will assume a DACbit word includes eight bits. Thus, iteration count N would be set to 8. After iteration count N has been set, the desired resolution level, B, is selected (step 84). K, the selected resolution level, is a constant. All DAC bits are set to zero and stored in step 86.

In step 88, iteration count N is decreased by 1. In step 90, the most significant DACbit is set to 1 and tested in accordance with steps 92 through 106 to determine whether the value achieves the desired resolution selected in step 84. In step 92, the amplitude of the low frequency pulses is determined by finding the high to low frequency transition. The amplitude of the low frequency pulses is determined from amplitude detector 50, converted to digital form by analog to digital converter 52 and stored in register L in drive microprocessor 18 (step 94). The amplitude of the high frequency pulses is determined by finding the low to high frequency transition in step 96. The amplitude of the high frequency pulses is determined from amplitude detector 50, converted to digital form by analog to digital converter 52 and stored in register H in drive microprocessor 18 (step 96).

After the amplitudes of the low frequency pulses and the high frequency pulses are determined in steps 94 and 96, respectively, resolution is calculated in step 98 in accordance with the equation, $$R = H/L \qquad (1)$$

where R is equal to the amplitude of the high frequency signal divided by the low frequency signal.

In step 100, if the resolution R is less than or equal to the desired resolution value K, selected in step 84, the particular DACbit being tested is stored in step 106. However, if the resolution R exceeds the desired resolution value K, the particular DACbit being tested is set back to zero (step 104) before being stored in step 106.

If the iteration count N is greater than zero (step 108), the microprocessor returns to step 88 along path 110 to test the next most significant DACbit. Step 88 subtracts one from the iteration count and step 90 selects the next most significant DACbit to be tested in accordance with the steps described above.

In other words, the DACbits represent the multiplier and during each iteration, until eight iterations have been completed, the value of the DACbits are changed one at a time to determine if changing that particular bit causes the desired resolution to be exceeded. For example, after initialization of all DACbits to zero, the most significant DACbit would be set to one and then changed to zero only if that caused the resolution to exceed the desired resolution. The next most significant bit would be set to one in the next iteration and tested in the same manner to see if the change caused the resolution to exceed the desired resolution. In this way, only eight iterations would be required to test 556 possibilities by choosing one or zero for each bit, starting with the most significant bit.

While this invention has been described with reference to its presently preferred embodiment(s), its scope is not limited thereto. Rather, such scope is only limited insofar as defined by the following set of claims and all equivalents thereof.

What is claimed is:

1. A method of recovering digital data stored on magnetic medium, comprising the steps of:

reading data from the magnetic medium with a read head to recover an analog signal having high frequency and low frequency components;

processing the analog signal through a programmable slimming filter;

analyzing the output of the slimming filter; and then utilizing closed loop control to adjust the characteristics of the slimming filter to improve the ratio of the high frequency components relative to the low frequency components until a preferred resolution is achieved.

2. The invention of claim 1 wherein the step of reading data further comprises the step of:

reading a predetermined test pattern stored on the magnetic medium.

3. The invention of claim 2 wherein the step of reading a test pattern further comprises the preliminary step of:

writing the predetermined test pattern on the magnetic medium with a write head.

4. The invention of claim 3 wherein the step of writing the predetermined test pattern further comprises the step of:

writing said test pattern on said magnetic medium separately from the digital data stored on the magnetic medium to be recovered.

5. The invention of claim 1 wherein the read head includes analog read electronics.

6. The invention of claim 1 wherein the step of reading data further comprises the steps of:

reading a predetermined test pattern stored on the magnetic medium separately from the digital data to be recovered.

7. The invention of claim 1 wherein the step of reading data further comprises the steps of:

generating signals related to the data to be recovered from the magnetic medium with the read head;

separating the signals into a plurality of channels; and combining the outputs of said plurality of channels in a predetermined relationship to enhance said signals for improved data recovery.

8. The invention of claim 7 wherein the step of adjusting the characteristics further comprises the step of:

altering said predetermined relationship.

9. The invention of claim 1 wherein the step of reading data further comprises the step of:

filtering analog signals from the read head with the slimming filter mirroring the high frequency rolloff characteristics.

10. The invention of claim 9 wherein said filtering step further comprises the steps of:

separating analog signals into a plurality of channels; and combining the outputs of said channels in a predetermined amplitude ratio.

11. The invention of claim 10 wherein said step of modifying said characteristics further comprises the step of:

altering said predetermined ratio.

12. The invention of claim 9, further comprising the steps of:

iterating said reading, determining and modifying steps to achieve a predetermined magnitude of said determined value.

13. A method of recovering digital data stored on magnetic medium, comprising the steps of:

reading data from the magnetic medium with a read head to recover an analog signal having high frequency and low frequency components, wherein the step of reading data further comprises the step of reading a predetermined test pattern stored on the magnetic medium, the step of reading a test pattern further comprises the preliminary step of writing the predetermined test pattern on the magnetic medium with a write head, and the step of writing the predetermined test pattern further comprises the step of writing alternate short groups of transitions at differing transition rates;

processing the analog signal through a programmable slimming filter;

analyzing the output of the slimming filter; and then utilizing closed loop control to adjust the characteristics of the slimming filter to improve the ratio of the high frequency components relative to the low frequency components until a preferred resolution is achieved.

14. The invention of claim 13 wherein the differing transition rates include transition rates included within the data to be subsequently read.

15. The invention of claim 14 wherein the differing transition rates alternate between the highest and lowest transition rates of the data to be subsequently read.

16. A method of recovering digital data stored on magnetic medium, comprising the steps of:

reading data from the magnetic medium with a read head to recover an analog signal having high frequency and low frequency components;

processing the analog signal through a programmable slimming filter;

analyzing the output of the slimming filter, wherein the step of analyzing the output of the slimming filter further comprises the steps of:

determining the amplitude of signals related to data at a first transition rate;

determining the amplitude of signals related to data at a second transition rate different from said first transition rate; and determining said value in accordance with a ratio of said amplitudes; and then utilizing closed loop control to adjust the characteristics of the slimming filter to improve the ratio of the high frequency components relative to the low frequency components until a preferred resolution is achieved.

17. A method of recovering digital data stored on magnetic medium, comprising the steps of:

reading data from the magnetic medium with a read head to recover an analog signal having high frequency and low frequency components, wherein the step of reading data further comprises the steps of:

generating signals related to the data to be recovered from the magnetic medium with the read head;

separating the signals into a plurality of channels; and combining the outputs of said plurality of channels in a predetermined relationship to enhance said signals for improved data recovery;

processing the analog signal through a programmable slimming filter;

analyzing the output of the slimming filter; and then utilizing closed loop control to adjust the characteristics of the slimming filter to improve the ratio of the high frequency components relative to the low frequency components until a preferred resolution is achieved, wherein the step of adjusting the characteristics further comprises the step of altering said predetermined relationship, wherein said predetermined relationship is a ratio of the amplitudes of signals in each said channel and said step of altering said predetermined relationship further comprises the step of altering said ratio.

18. The invention of claim 17 wherein said step of combining said outputs includes the step of multiplying the amplitude of one of said channels by a predetermined multiplier and said step of altering said ratio further comprises the step of:

adjusting said multiplier.

19. A method of recovering digital data stored on magnetic medium, comprising the steps of:

reading data from the magnetic medium with a read head to recover an analog signal having high frequency and low frequency components, wherein the step of reading data further comprises the steps of:

generating signals related to the data to be recovered from the magnetic medium with the read head;

separating the signals into a plurality of channels; and combining the outputs of said plurality of channels in a predetermined relationship to enhance said signals for improved data recovery, wherein said separating and combining step implement the function of the slimming filter and said step of combining the outputs of said channels further comprises the step of altering the ratio in which said channels are combined;

processing the analog signal through a programmable slimming filter;

analyzing the output of the slimming filter; and then utilizing closed loop control to adjust the characteristics of the slimming filter to improve the ratio of the high frequency components relative to the low frequency components until a preferred resolution is achieved.

20. The invention of claim 19 wherein said altering step further comprises the steps of:

modifying the amplitude of the signals in one of such channel in accordance with the determined value; and combining the signals after modification to implement the slimming filter to enhance subsequent recovery of the digital data.

21. A closed loop control system for recovering digital data stored on magnetic medium, comprising:

read head means for reading data from magnetic medium to recover an analog signal having high frequency and low frequency components;

means for processing the analog signal through a programmable slimming filter;

means for analyzing the output of the slimming filter; and closed loop control means for adjusting the characteristics of the slimming filter to improve the ratio of the high frequency components relative to the low frequency components until a desired or predetermined resolution is achieved.

22. The system claimed in claim 21 wherein the read head means further comprises:

means for reading a predetermined test pattern stored on the magnetic medium separately from the digital data to be recovered.

23. The system of claim 22 further comprising:
write head means for writing the predetermined test pattern on the magnetic medium separately from the digital data to be recovered.

24. The system of claim 21 wherein the read head means further comprises:
means for separating signals received from the magnetic medium into a plurality of channels having outputs;
means for combining the channel outputs to implement a slimming filter function; and
means for adjusting the ratio of the amplitudes of the channel outputs before being combined.

25. A system for recovering digital data stored on magnetic media, comprising:
read head means for reading data from magnetic media to determine a value related to the frequency response of the system, wherein the read head means further comprises:
means for separating signals received from the magnetic medium into a plurality of channels having outputs;
means for combining the channel outputs to implement a slimming filter function; and
means for adjusting the ratio of the amplitudes of the channel outputs before being combined; and then
means for modifying the frequency response of the system in accordance with said value for subsequent data reading operations from said media, wherein said means for modifying the frequency response of the system further comprises means for altering the ratio of channel output amplitudes.

26. A method of recovering digital data stored on magnetic medium, comprising the steps of:
writing test pattern data on magnetic medium with a read/write head;
generating signals related to data recovered from the magnetic medium with the read/write head;
implementing a slimming filter function by combining signals related to said generated signals;
determining the ratio of the amplitudes of signals in high and low frequency portions of said test pattern data; and
altering the slimming filter function in accordance with the reading of the test pattern data to enhance subsequent digital data recovery.

27. The invention of claim 26, wherein the step of altering the slimming filter function further comprises the step of:
altering the relative amplitudes of the signals being combined in accordance with the determined ratio of channel amplitudes.

28. The invention of claim 26 further comprising the steps of:
iterating the steps of generating signals, determining the ratio of amplitudes and altering the slimming filter function to achieve a predetermined amplitude ratio.

29. A system for recovering digital data stored on magnetic medium, comprising:
magnetic medium;
a read/write head for writing signals to, and reading signals from, the magnetic medium related to digital data;
means for controlling the read/write head to provide signals from the test pattern data;
means for controlling the read/write head to read signals from digital data stored on the magnetic medium;
means for separating the digital data signals into a plurality of channels;
means for modifying the amplitude of the digital data signals in one of said channels in accordance with a ratio of the amplitudes of the test pattern signals in different transition rate portions to compensate the digital data signals for the frequency response of the head/media combination; and
means for combining the digital data signals in said channels to recover the digital data.

30. The system for recovering digital data claimed in claim 29 wherein the means for combining further comprises:
slimming filter means for mirroring the high frequency rolloff characteristics of the head and medium system to enhance digital data recovery.

* * * * *